United States Patent [19]

Kulbeck

[11] Patent Number: 5,524,913
[45] Date of Patent: Jun. 11, 1996

[54] IN-LINE PNEUMATIC-TIRED ROLLER SKATE WITH SCRAPERS

[76] Inventor: Roger O. Kulbeck, 1000 N. 17th #205, Bozeman, Mont. 59715

[21] Appl. No.: 395,915

[22] Filed: Feb. 28, 1995

[51] Int. Cl.⁶ ............................ A63C 17/06; B60S 1/68
[52] U.S. Cl. ................ 280/11.22; 280/855; 280/11.2
[58] Field of Search ....................... 280/11.2, 11.22, 280/855, 856, 158.1

[56] References Cited

U.S. PATENT DOCUMENTS

| | | | |
|---|---|---|---|
| 246,296 | 8/1881 | Dean | 280/855 |
| 1,402,010 | 1/1922 | Ormiston | 280/11.2 X |
| 2,073,708 | 3/1937 | Parrish | 280/11.23 X |
| 3,000,643 | 9/1961 | Levin | 280/11.2 |
| 3,877,710 | 4/1975 | Nyitrai . | |
| 4,031,937 | 6/1977 | Georgia et al. . | |
| 4,310,168 | 1/1982 | Macaluso . | |
| 4,312,514 | 1/1982 | Horowitz et al. | 280/11.2 |
| 4,957,150 | 9/1990 | Dionisio et al. . | |
| 5,143,387 | 9/1992 | Colla | 280/11.22 X |
| 5,171,032 | 12/1992 | Dettmer | 280/11.22 X |
| 5,192,099 | 3/1993 | Riutta | 280/11.22 X |
| 5,232,231 | 8/1993 | Carlsmith | 280/11.2 |
| 5,346,231 | 9/1994 | Ho . | |
| 5,441,286 | 8/1995 | Pozzobon | 280/11.22 X |

FOREIGN PATENT DOCUMENTS

| | | | |
|---|---|---|---|
| 455540 | 5/1913 | France | 280/158.1 |
| 1146701 | 11/1957 | France | 280/11.2 |

Primary Examiner—Brian L. Johnson
Attorney, Agent, or Firm—Richard C. Litman

[57] ABSTRACT

An in-line wheeled roller skate for traversing rough terrain including low-profiled, wide-treaded, high-volumed pneumatic tires each followed by scrapers for discouraging debris from binding the tire against a shielding U-frame. The scrapers may be maintained at a fixed distance away from or in contact with the tread. A brake is provided at the rear of the roller skate.

4 Claims, 3 Drawing Sheets

5,524,913

IN-LINE PNEUMATIC-TIRED ROLLER SKATE WITH SCRAPERS

BACKGROUND OF THE INVENTION

1. Field of the Invention

This invention relates to roller skates. More specifically, the present invention relates to roller skates having pneumatic tires.

2. Description of the Prior Art

In-line skating has become enormously popular. Over the years, inventors have improved boot and wheel designs to accommodate a variety of specialized activities. Some fast-evolving areas include: hockey, speed skating, trick skating and touring. The present invention breaks into yet another frontier: mountain skating.

The present invention has features which permits the skater to leave the restrictions of conventional skating surfaces, i.e. roads and sidewalks, and enjoy the freedom of backcountry touring.

Several types of pneumatic-tired roller skates are described in the literature. For example, U.S. Pat. No. 3,877,710, issued Apr. 15, 1975, to Ernest S. Nyitrai, describes a two-wheeled, pneumatic-tired roller skate including a tire with a closed cross-sectional profile; the tire surrounds and defines a toroidal volume. The invention may include a variety of tires, each having different air pressure. Tire air pressure is not adjustable.

U.S. Pat. No. 4,031,937, issued Jun. 28, 1977, to Edward J. Georgia, describes a pneumatic-tired roller skate including a tire with a closed cross-sectional profile. An offset segment of the tire is adhesively secured to the hub. The tread has a footprint considerably larger than segment adhered to the hub. The lopsided tire cross-sectional profile gives the appearance that the forces on the tire generated from skating would foster bending or tearing away of the tire. The tire is described as being inflatable; inflation means, however, are not described.

U.S. Pat. No. 4,310,168, issued Jan. 12, 1982, to Mary H. Macaluso, describes a pneumatic-tired roller skate including a tire with a closed cross-sectional profile. The skate includes a deformed, triangular plate which may be secured to the user's footwear. The tire appears to be received and retained within a groove in the hub. As above, this tire also is described as being inflatable; inflation means, however, are not described.

U.S. Pat. No. 4,957,150, issued Sep. 18, 1990, to Louis A. Dionisio, describes a pneumatic-tired roller skate with an open cross-sectionally-profiled inner tube and tread; the volume defined by the tire and hub contains pressurized air. In one embodiment, the inner tube and tread are secured to the hub with individually-designated straps that are tightened with threaded fasteners. In a second embodiment, both the inner tube and tread are secured to the hub with the same adjustable strap. The invention includes a pin hole in the hub through which the user may inflate the tire.

U.S. Pat. No. 5,346,231, issued Sep. 13, 1994, to Dianna Ho, describes a pneumatic-tired roller skate including a tire with an open cross-sectional profile. The hub is elongated radially to permit employment of a low-profiled, narrow-treaded tire. The hub is secured against a singular outer race of a bearing package which includes two sets of ball bearings. The hub also includes a valve for receiving a pin to inflate the tire.

None of the above references, taken alone or in combination, are seen as teaching or suggesting the presently claimed pneumatic-tired roller skate.

SUMMARY OF THE INVENTION

The present invention relates to roller skates. The invention includes a U-shaped frame rigidly mounted to a conventional boot. The frame has at least one pair of through-bores, one in each leg in registration with the other. Each pair of throughbores receives an axle. Each axle receives a pair of bearings, a pair of dust covers therefore and a hub. The axle is secured to the fame, laterally fixing the wheel assembly, with a nut.

Each hub is configured to retain a low-profiled tire having a wide tread. Additionally, the tire and hub define a large volume for providing a comfortable ride and for accommodating and maintaining adequate traction on the rough natural terrain for which the invention is purposed. Each hub is further configured to maintain a pair of bearing packages, axially disparate to provide stability. Increased bearing spacing will also increase bearing life. Axially separated bearings are better predisposed to sustain the normal forces for which they were intended, rather than non-normal forces which distort the configuration of the bearing assembly. Each hub also includes a valve for inflating the pneumatic tire.

Scrapers are mounted to the frame, rearward of each tire for shunting away mud, stray rocks and other debris. The scrapers may be radially adjusted and mounted at a set distance away from the axle. The scrapers may also be biased away from the frame and toward the tire to maintain continuous contact therewith.

A brake is mounted to or molded integral with the frame. The brake is an elongated member to which a durable pad is affixed. The skater employs the brake by tilting up the skater's toes and digging the skater's heel into the rear of the skate, thus urging the durable pad against the skating surface.

In consideration of the above, an object of the invention is to provide a roller skate having scrapers to discourage binding of rocks and debris from binding the tire against the frame.

Another object of the invention is to provide a roller skate having low-profiled, wide-treaded, large-volumed tires for superior traction and a comfortable ride on rough terrain.

A further object of the invention is to provide a roller skate having widely spaced bearings for stability and increased bearing life.

It is an object of the invention to provide improved elements and arrangements thereof in an apparatus for the purposes described which is inexpensive, dependable and fully effective in accomplishing its intended purposes.

These and other objects of the present invention will become readily apparent upon further review of the following specification and drawings.

BRIEF DESCRIPTION OF THE DRAWINGS

Similar reference characters denote corresponding features of the invention consistently throughout the attached drawings.

DETAILED DESCRIPTION OF THE PREFERRED EMBODIMENTS

Figure 1:
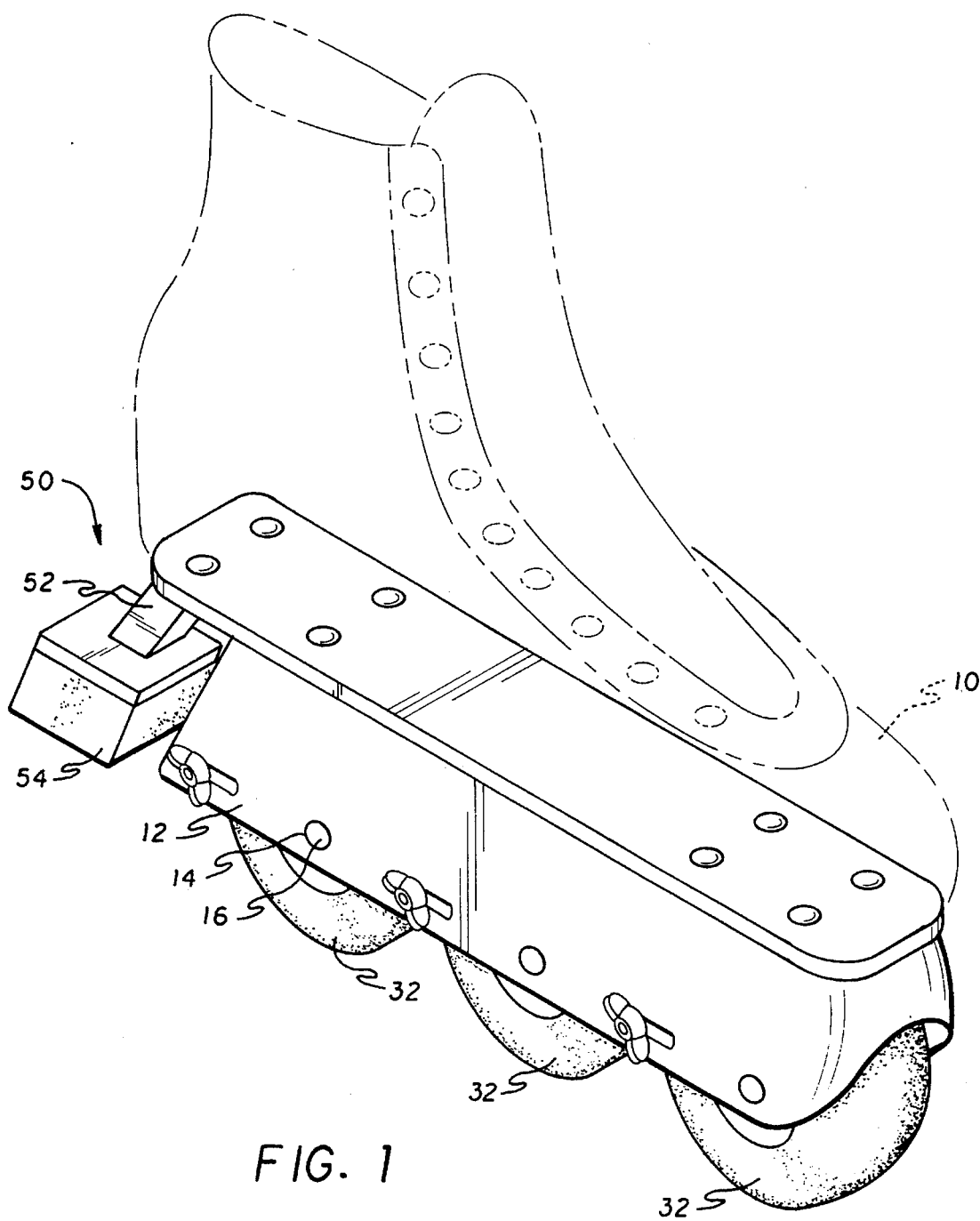
FIG. 1 is an environmental perspective view of an embodiment of the invention.

Referring to FIG. 1, the invention is shown including a U-shaped frame 12 rigidly mounted to a conventional skate boot 10. The frame 12 may be manufactured from reasonably rigid materials such as lightweight metals, synthetic thermoplastics, thermosetting polymers and co-polymers, polyolefins, polyurethanes, phenolics and the like. The frame 12 has a plurality of throughbores 14 for receiving axles 16.

Figure 2:
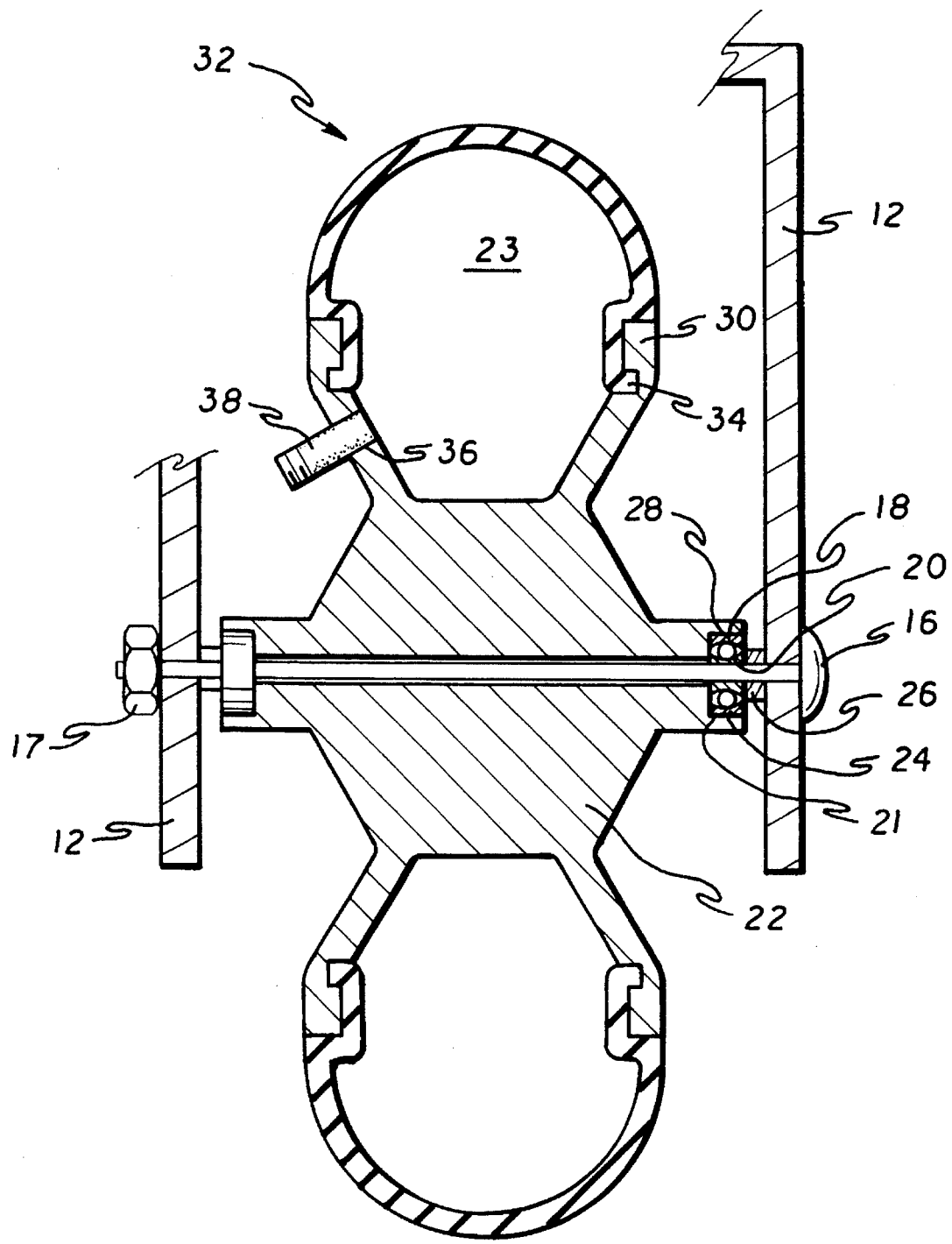
FIG. 2 is a fragmentary, cross-sectional view of a wheel assembly used in the invention.

Referring also to FIG. 2, each axle 16 receives a set of bearings 18. The inner races 20 of the bearings 18 may frictionally engage an axle 16 or maintain close tolerances therewith. The axle 16 threadingly interengages a nut 17.

Counterbores 21 in the hub 22 receive the outer races 24 of each bearing 18. The counterbores 21 may frictionally engage each outer race 24 or maintain close tolerances therewith. A spacer 26 is interposed between each bearing 18 and the frame 12. Each spacer 26 protects its constituent bearing 18 from contamination. Each spacer 26 also compels the inner race 20 of its concomitant bearing 18 axially against the hub 22 such that the outer race 24 is urged against the shoulder 28 of the hub 22.

The hub 22 is intended to be rugged to endure the punishing terrain of backcountry trails. Further, the hub 22 is dimensioned and configured to maximize axial distance between the bearings 18. Increased bearing spacing will increase bearing life because the bearings 18 will sustain largely normal forces rather than non-normal forces which distort the configurations of the bearings 18. Increased bearing spacing will also permit the hub 22 and the tire 32 to define a large volume 23 containing fluid.

Each hub 22 includes a lip 30 for receiving the lip 34 of a tire 32. Lips 30 and 34 sealingly interengage. A throughbore 36 in each hub 22 receives a valve 38 for introducing fluid or pressurized air into volume 23. The valve 38 may be of the presta-, schraeder- or pin- receiving-type.

Referring again to FIG. 1, the three tires 32 is intended to have a low profile for keeping the skater's center of gravity as low as possible. The tire 32 is also intended to have a wide tread for exceptional traction on backcountry trails. The hub 22 and tire 32 are intended to define a large volume 23 for a comfortable ride over rough terrain.

The invention also includes a brake 50 for arresting the skater's motion. The brake 50 comprises an elongated member 52 including an attached durable pad 54. The member 52 may be molded integral with or fixed to the frame 12. The pad 54 may be attached to the member 52 with threaded fasteners (not shown), but may be attached by any means having similar capability.

Figure 3:
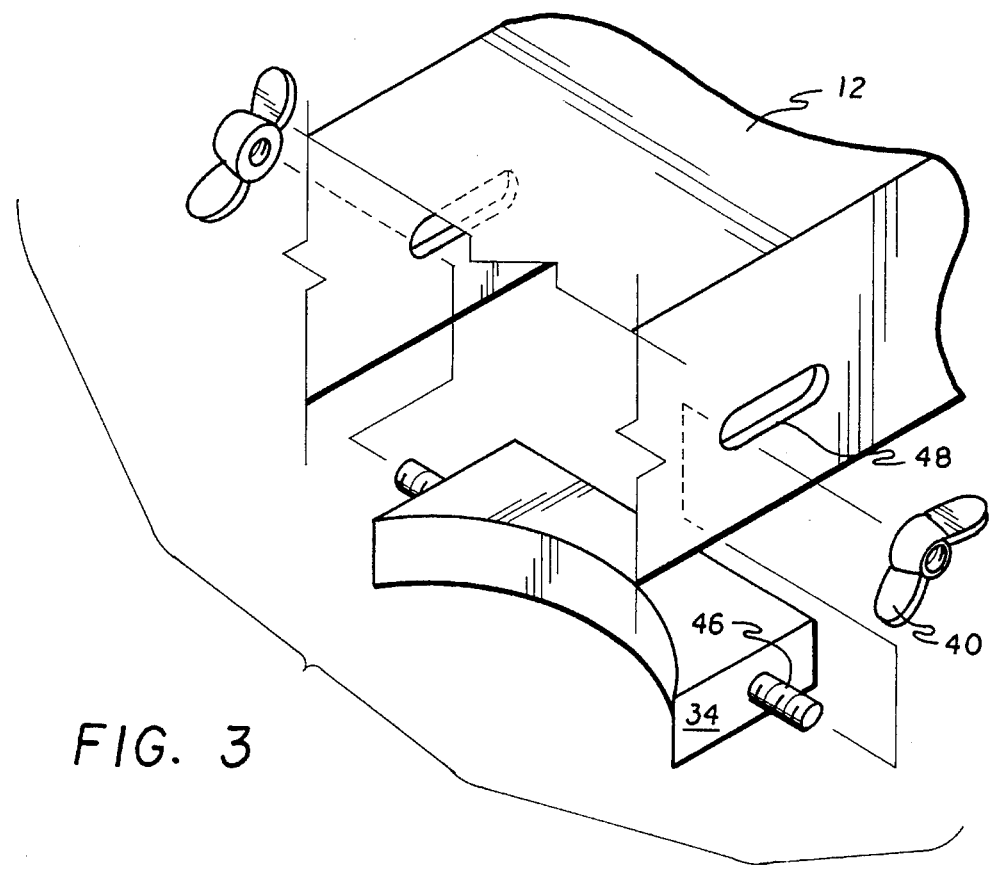
FIG. 3 is a fragmentary, exploded view, partly in section, of an embodiment of a scraper used in the invention.

Referring to FIG. 3, the invention is shown including scrapers 34. While skating on backcountry trails, skaters will likely encounter mud, rocks and other debris. The scrapers 34 having a smooth arcuate surface 35 are located proximate each tire 32 for cleaning the tires or preventing debris from binding the tire 32 against the frame 12. Each scraper 34 may include a threaded shaft 46 at each end of the scraper 34, each of which being received in one of the slots 48 in the frame 12. Each scraper 34 may be adjusted in the slots 48, radially with respect to the tire 32, and fixed with wing nuts 40.

Figure 4:
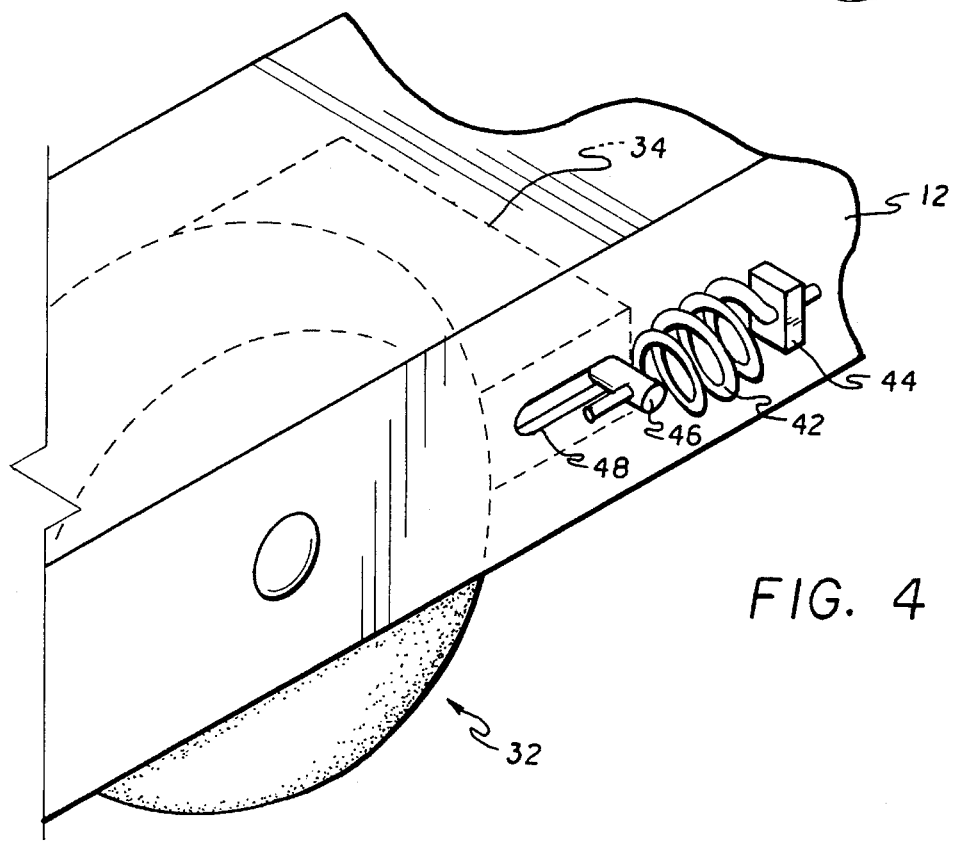
FIG. 4 is a fragmentary, exploded view, partly in section, of another embodiment of a scraper used in the invention.

Referring to FIG. 4, the scrapers 34 may also be biased against the frame 12 and toward the tire 32 with a spring 42 at each end of the scraper. Biasing the scraper 34 is purposed at maintaining continuous contact between the scraper 34 and the tire 32. The spring 42 mounts to a boss 44 and the shaft 46 of the scraper 34.

The present invention is not intended to be limited to the embodiments described above, but to encompass any and all embodiments within the scope of the following claims.

I claim:

1. A roller skate including a boot and up to three in-line pneumatic tires comprising;

a U-shaped frame having a first and a second leg, said first leg having up to three throughbores disposed therein, said second leg having throughbores similarly configured and in registration with each said throughbore in said first leg, said frame fixed relative to the boot;

an axle for each pneumatic tire dimensioned and configured to be received in both said throughbores in said first and second legs of said frame;

a pair of spacers having axial throughbores, said spacers disposed on each said axle and positioned between said first and said second legs of said frame;

a pair of bearings each having an inner and an outer race, each said inner race fixed relative to each said axle and positioned between each said spacer, each said spacer contacting one of said bearings;

a hub having a first and a second face, an axial bore positioned between said first and second faces, said hub disposed on each said axle and positioned between said bearings, said bore maintaining clearance with said axle;

said hub having a pair of counterbores in registration with said throughbore disposed in said first and second faces, each said counterbore receiving an outer race of each said bearing;

said hub including a pair of radial flanges, each said flange including a lip disposed at a distal end of each said flange;

one of said flanges of said hub further including a valve for selectively admitting air and providing means for inflating and retaining air within a volume defined by said hub and each said pneumatic tire;

each said pneumatic tire including a tread and a pair of lips which sealingly engage said flange lips of said hub;

a scraper for each said pneumatic tire, each said scraper positioned between said first and second legs of said frame and rearward of each said pneumatic tire, each said scraper smooth arcuate face, said face being dimensioned and configured to complementarily receive said tread of said pneumatic tire, whereby said scraper discourages rocks and debris from binding each said pneumatic tire;

said first leg of said frame having a slot disposed rearward of each said throughbore disposed therein, said second leg having a similarly configured slot in registration with each said slot in said first leg;

each said scraper having a first end and a second end;

said first end of each said scraper being received in each said slot in said first leg of said frame, said second end of each said scraper being received in each said slot in registration in said second leg of said frame, each first and second scraper end extending through each said slot in registration in said first and second leg of said frame; and a spring positioned between each first and second scraper ends and said frame and located on an exterior of said frame, each spring biasing each said scraper toward each said tire.

2. A roller skate according to claim 1, wherein each said scraper is maintained at a distance proximate to the tread of each said pneumatic tire.

3. A roller skate according to claim 1, wherein each said scraper is maintained in contact with the tread of each said pneumatic tire.

4. A roller skate according to claim 1, wherein each said pneumatic tire is low-profiled, wide-treaded and high-volumed.

* * * * *